(12) United States Patent
Breeds et al.

(10) Patent No.: US 8,682,843 B2
(45) Date of Patent: *Mar. 25, 2014

(54) METHOD AND SYSTEM FOR PROFILE TYPING IN BATCH LOADING DOCUMENTS INTO A SERVICE REGISTRY IN A COMPUTING ENVIRONMENT

(75) Inventors: Robert J. Breeds, Swindon (GB); David J. Seager, Winchester (GB); Evan G. Jardine-Skinner, Southampton (GB); Philip R. Taunton, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,659

(22) Filed: Apr. 30, 2012

(65) Prior Publication Data

US 2012/0215802 A1 Aug. 23, 2012

Related U.S. Application Data

(63) Continuation of application No. 12/243,856, filed on Oct. 1, 2008, now Pat. No. 8,214,339.

(51) Int. Cl.
*G06F 7/00* (2006.01)
*G06F 17/00* (2006.01)

(52) U.S. Cl.
USPC ............................ 707/608; 707/609; 707/687

(58) Field of Classification Search
USPC .......................................... 707/608–609, 687
See application file for complete search history.

(56) References Cited

U.S. PATENT DOCUMENTS

| | | | |
|---|---|---|---|
| 6,985,939 B2 | 1/2006 | Fletcher et al. | |
| 7,107,333 B2 | 9/2006 | Burbeck et al. | |
| 7,260,743 B2 | 8/2007 | Fellenstein et al. | |
| 7,428,582 B2 | 9/2008 | Bean et al. | |
| 7,454,743 B2 | 11/2008 | Fuchs | |
| 7,562,339 B2 | 7/2009 | Racca et al. | |
| 7,752,326 B2 | 7/2010 | Smit | |
| 7,814,060 B2 | 10/2010 | Stoyanova | |
| 7,831,693 B2 | 11/2010 | Lai | |
| 7,865,481 B2 | 1/2011 | Gauthier et al. | |
| 8,214,339 B2* | 7/2012 | Breeds et al. ................ | 707/701 |
| 2004/0133580 A1* | 7/2004 | Liu et al. ...................... | 707/100 |

(Continued)

OTHER PUBLICATIONS

McKee, B. et al., "Introducing IBM WebSphere Service Registry and Repository, Part 1: A day in the life of WebSphere Service Registry and Repository in the SOA life cycle," IBM Websphere Service Registry and Repository, Sep. 19, 2006, pp. 1-5, IBM, United States.

(Continued)

*Primary Examiner* — Wilson Lee
*Assistant Examiner* — Jessica N Le
(74) *Attorney, Agent, or Firm* — Kenneth L. Sherman, Esq.; Michael Zarrabian, Esq.; Sherman & Zarrabian LLP (57) ABSTRACT

A method and system for profile typing in batch loading document files into a service registry module in a computing environment, is provided. One implementation involves loading document files into a service registry by profile typing document files for loading into a service registry of a service oriented architecture (SOA) computing environment, including automatically identifying a profile of each document file; and batch loading the document files into the service registry based on their corresponding profile type.

19 Claims, 6 Drawing Sheets

(56) References Cited

U.S. PATENT DOCUMENTS

| | | | |
|---|---|---|---|
| 2004/0158843 | A1 | 8/2004 | Cloccarelli |
| 2005/0091174 | A1 | 4/2005 | Akkiraju et al. |
| 2005/0209984 | A1* | 9/2005 | Brown et al. ............... 707/1 |
| 2005/0251527 | A1* | 11/2005 | Phillips et al. ............ 707/101 |
| 2005/0262189 | A1 | 11/2005 | Mamou et al. |
| 2007/0162478 | A1* | 7/2007 | Hall et al. ............... 707/101 |
| 2007/0168479 | A1* | 7/2007 | Bean et al. ............... 709/223 |
| 2008/0114799 | A1 | 5/2008 | Chasen |
| 2008/0163218 | A1 | 7/2008 | Ostermeier et al. |
| 2008/0285481 | A1* | 11/2008 | Hao et al. ............... 370/254 |
| 2009/0083239 | A1* | 3/2009 | Colgrave et al. ............ 707/4 |
| 2009/0193057 | A1 | 7/2009 | Maes |
| 2010/0017783 | A1 | 1/2010 | Brininstool et al. |

OTHER PUBLICATIONS

McKee, B. et al., "Introducing IBM WebSphere Service Registry and Repository, Part 2: Architecture, APIs, and content," IBM WebSphere Service Registry and Repository, Sep. 29, 2006, pp. 1-9, IBM, United States.

Optima SC Inc., "Optima SC file identifier software," Apr. 4, 2007, pp. 1-3, Optimasc, Quebec, Canada.

International Business Machines (IBM), "IBM WebSphere Service Registry and Repository V6.2 delivers the foundation for enabling SOA governance," IBM United States Announcement, Jul. 1, 2008, pp. 1-15, IBM, United States.

International Business Machines (IBM), "IBM WebSphere Service Registry and Repository Version 6.2 information center," IBM WebSphere Registry and Repository, Jul. 23, 2008, pp. 1-2, IBM, United States.

International Business Machines (IBM), "IBM Rational Asset Manager," IBM, Jun. 2007, pp. 1-8, IBM, United States.

Hewlett-Packard Development Company L.P. (HP), "HP SOA Systinet Software Data Sheet", Aug. 2008, pp. 1-4, Rev.1., HP, United States.

U.S. Non-Final Office Action for U.S. Appl. No. 12/243,856 mailed Feb. 1, 2011.

U.S. Final Office Action for U.S. Appl. No. 12/243,856 mailed Jul. 20, 2011.

U.S. Advisory Action for U.S. Appl. No. 12/243,856 mailed Sep. 28, 2011.

U.S. Notice of Allowance for U.S. Appl. No. 12/243,856 mailed Feb. 22, 2012.

\* cited by examiner

METHOD AND SYSTEM FOR PROFILE TYPING IN BATCH LOADING DOCUMENTS INTO A SERVICE REGISTRY IN A COMPUTING ENVIRONMENT

CROSS-REFERENCE TO RELATED APPLICATIONS

This patent application is a continuation patent application of U.S. patent application Ser. No. 12/243,856, filed on Oct. 1, 2008, the disclosure of which is incorporated herein its entirety by reference.

BACKGROUND

1. Field of the Invention

The invention relates generally to service oriented environments, and in particular to loading documents into a service registry.

2. Background Information

In a service oriented architecture (SOA) environment, Service Registries contain documents that relate to services and the associated schemas, policies, etc. The document type of any document that is loaded into a Service Registry must be defined at load time to allow the system to shred the logical objects from the document. However, loading multiple files into a service registry is time consuming. Batch processing is not simple, as each file can be loaded as one of several "Service Registry Document Types".

Further, the user is required to select each file to be loaded into the service registry, specifying the type of each document, such that the registry application can treat the document content accordingly. Having to manually select the document types precludes the use of batch processing. From a usability perspective, having to repeat the same operation (load document and select type) is tedious and prone to error.

An existing SOA approach attempts to address such issues by creating an archive that contains all files to load at once. The Service Registry (SR) will automatically decide which files to load as which SR Document Types based on their extension. However, a shortcoming of such an approach is that the files to be loaded may not fit into the naming scheme defined in the SR.

BRIEF SUMMARY

The invention provides a method and system for profile typing in batch loading document files into a service registry module in a computing environment. One embodiment involves profile typing document files for loading into a service registry of a service oriented architecture (SOA) computing environment, including automatically identifying a profile of each document file; and batch loading the document files into the service registry based on their corresponding profile type.

Automatically identifying profiles of document files may include essentially non-interactively identifying profiles of document files. Identifying a profile of each document file further may include identifying a profile of each document file from a set of Service Registry Document Types. The Service Registry Document Types may include: definitions, schema, Policy, module, XML, other. Identifying a profile of each document file may include identifying a profile of each document file by introspection. The process may further include providing a predefined pattern to match an initial document file type, and then profile typing document files for loading into a service registry by automatically identifying a profile of each document file for accuracy.

These and other features, aspects and advantages of the invention will become understood with reference to the following description, appended claims and accompanying figures.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and system for profile typing in batch loading document files into a service registry module in a computing environment. One embodiment includes providing a process which automatically (e.g., essentially non-interactively) identifies profiles of document files as Service Registry (SR) Document Types, to be loaded into a service registry of a service oriented architecture (SOA) computing environment. This then allows the user to load the files as the right SR Document Types in one large batch; an advantage being that a large batch of heterogeneous files can be loaded in one batch without user intervention. The process also allows the user to specify which files should be loaded as which SR Document Type.

In the following, first an example of service registry and repository in SOA is described. Then, a process for profile typing in batch loading documents into a service registry module, according to an embodiment of the invention is described.

Service Registry and Repository in SOA

Figure 1:
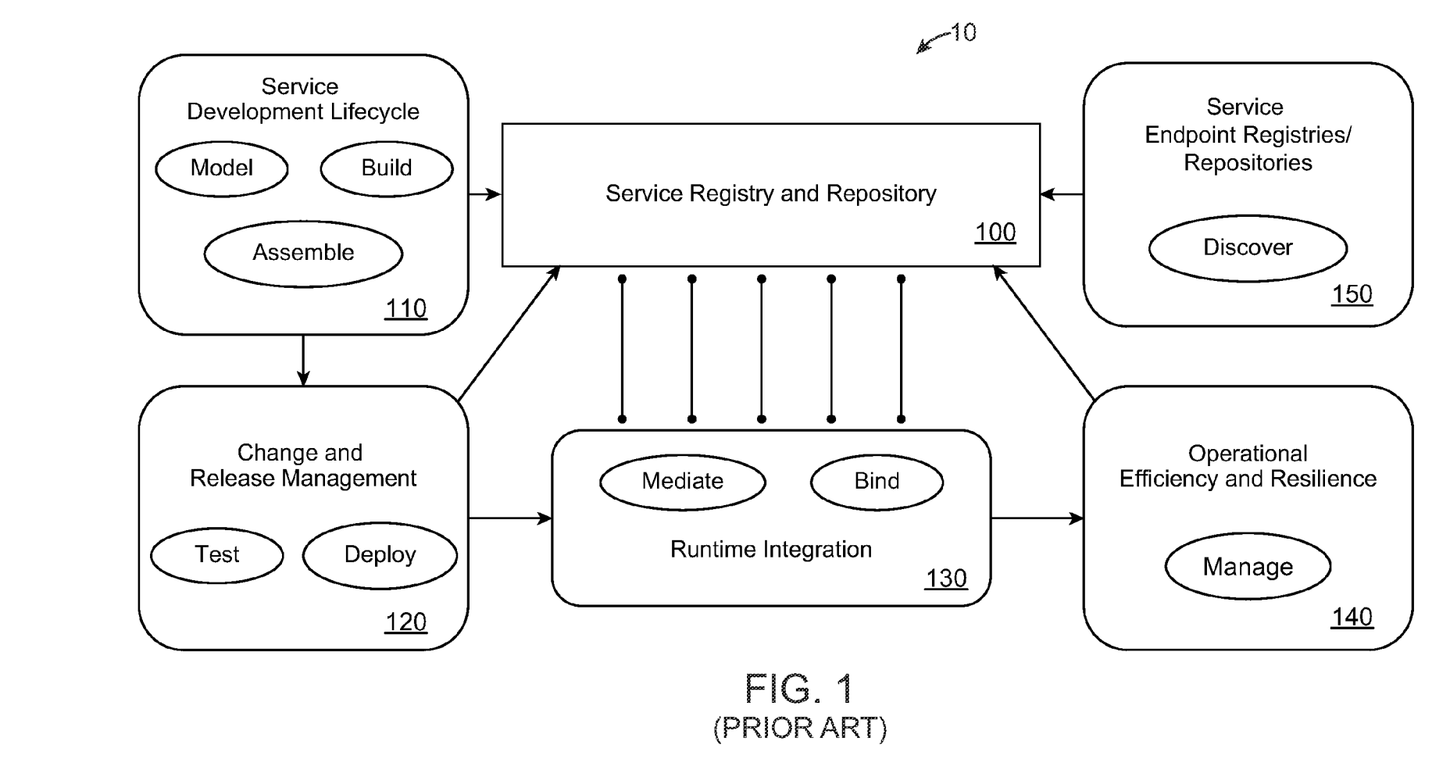
FIG. 1 shows a functional block diagram of a conventional service oriented architecture (SOA) computing environment.

As described in Barbara McKee et al., "Introducing IBM WebSphere Service Registry and Repository, Part 1: A day in the life of WebSphere Service Registry and Repository in the SOA cycle," Sep. 19, 2006, United States, and further described in Barbara McKee et al., "Introducing IBM WebSphere Service Registry and Repository, Part 2: Architecture, APIs, and content," Sep. 29, 2006, United States SOA separates service descriptions from their implementations, and uses this descriptive metadata across the service life cycle. Standards-based service metadata artifacts, such as Web Service Definition Language (WSDL), XML schema, Policy or Service Component Architecture (SCA) documents, capture the technical details of what a service can do, how it can be invoked, or what it expects other services to do. Service Registry and Repository is the master metadata repository for service interaction endpoint descriptions. As the integration point for service metadata, Service Registry and Repository establishes a central point for finding and managing service metadata acquired from a number of sources. It is where service metadata that is scattered across a computing enterprise is brought together to provide a single, comprehensive description of a service. FIG. 1 shows an example functional block diagram of an SOA 10 involving Service Registry and Repository (Service Registry or SR) 100. The SOA 10 further includes the following functions: Service Development Lifecycle 110, Change and Release Management 120, Runtime Integration 130, Operational Efficiency and Resilience 140, and Service Endpoint Registries/Repositories 150.

A business service is created in the model phase, and is translated into an executable composite application in the assemble phase, and then transitions into the SOA run time environment in the deploy and run phase, and is then observed and controlled in the manage phase.

During the development stages of the business service life cycle, the Service Registry and Repository 100 is used to locate the copies of record of candidate service interaction endpoints or mediating intermediaries, as well as, policies governing the interactions. As in the other SOA life cycle stages, the Service Registry and Repository 100 is complemented by repositories that specialize in managing SOA artifacts during the development stages of the life cycle. The Service Registry and Repository 100 provides the system of record for metadata describing service interaction endpoints.

Figure 2:
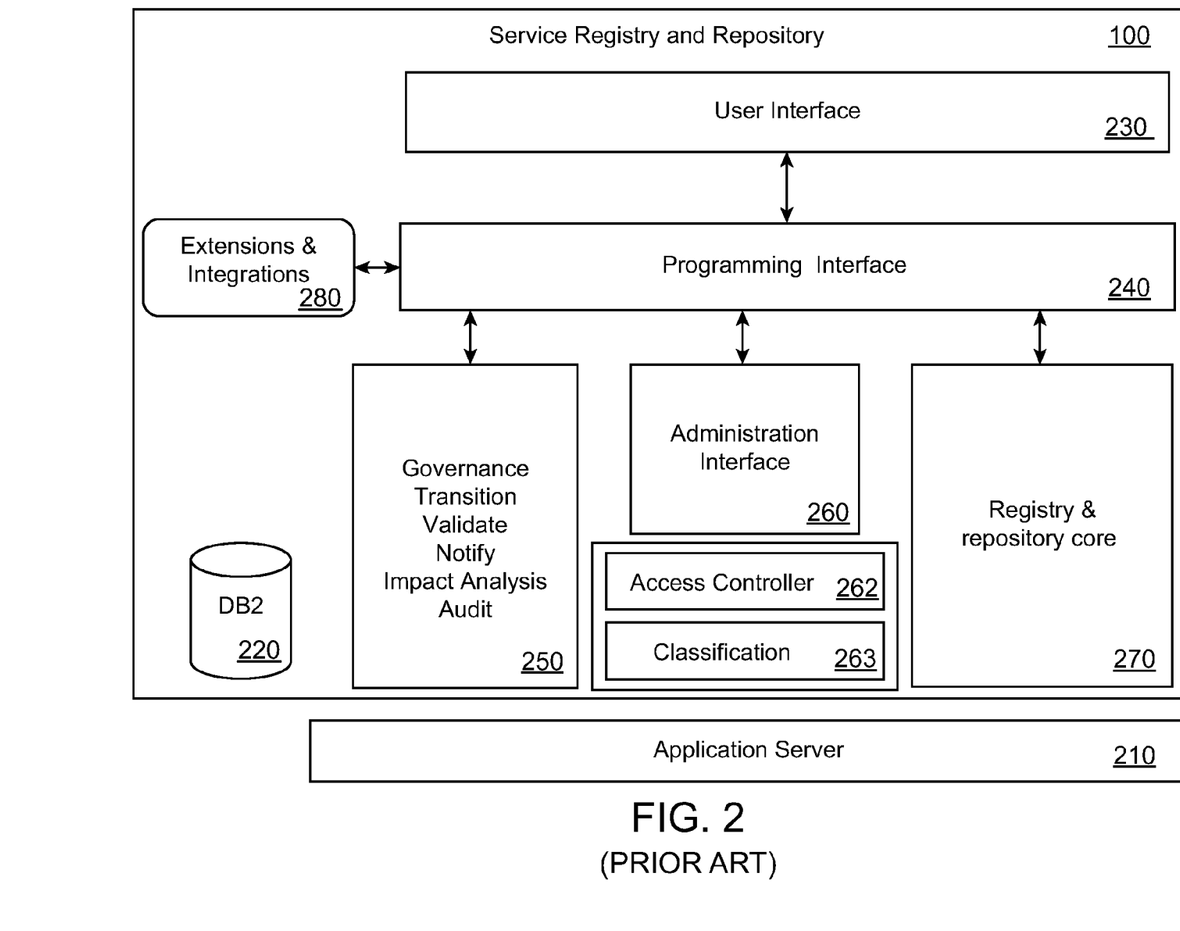
FIG. 2 shows a functional block diagram of a conventional Service Registry and Repository in an SOA.

Referring now also to FIG. 2, an overview of the architecture of the Registry and Repository is now provided. The Service Registry and Repository 100 runs on an Application Server 210 in a computing environment, and uses a database 220 as a backing store for service metadata persistence. The Service Registry and Repository 100 includes a user interface 230 for interaction with the Registry and Repository programmatically, and for interaction with service metadata in Registry and Repository. The Registry and Repository contains service metadata artifacts that are in the form of XML documents, concepts that represent service metadata entities that are not backed by a document in Registry and Repository, semantic metadata assigned to these service metadata artifacts and entities, and relationships among and between the artifacts and entities. A Programming Interface 240 allows performing basic operations (e.g., Create, Retrieve, Update, and Delete) on the Service Registry and Repository content (FIG. 3), and queries based on expressions against the content.

The Service Registry and Repository core 270 offers both Registry and Repository capabilities for service metadata. The repository allows users to store, manage and query service metadata artifacts holding service descriptions (WSDL, XSD, WS-Policy, SCDL or XML documents). The Registry and Repository core 271 further provides performing basic operations (e.g., Create, Retrieve, Update, and Delete) on the content, and also provides a query interface for finding a service endpoint or service interface.

The governance functions 250 provide the ability to model a service life cycle model for governed entities, define valid transitions between service states, write and plug-in validators to guard the transitions between states, and designate (notification) actions to be taken as result of the transition. It also provides interfaces to analyze the impact of changes to Registry and Repository content, and provides auditing of such changes.

Classifications 263 are involved in many interactions with Registry and Repository, and allow annotation of service descriptions and parts of service definitions with corporate vocabulary. They are used by Registry and Repository to capture the governance state.

Access Controller 262 provides an access control model that defines which user roles can perform specific types of actions on corresponding artifacts. Administration Interface 260 supports the import and export of Registry and Repository content for exchange with other Registry and Repository repositories and provides API for Registry and Repository configuration and basic administration (supporting interactions with the Access Control model and with the Classification systems). Extensions and Integrations 280 can also be used via the Programming Interface 240.

Figure 3:
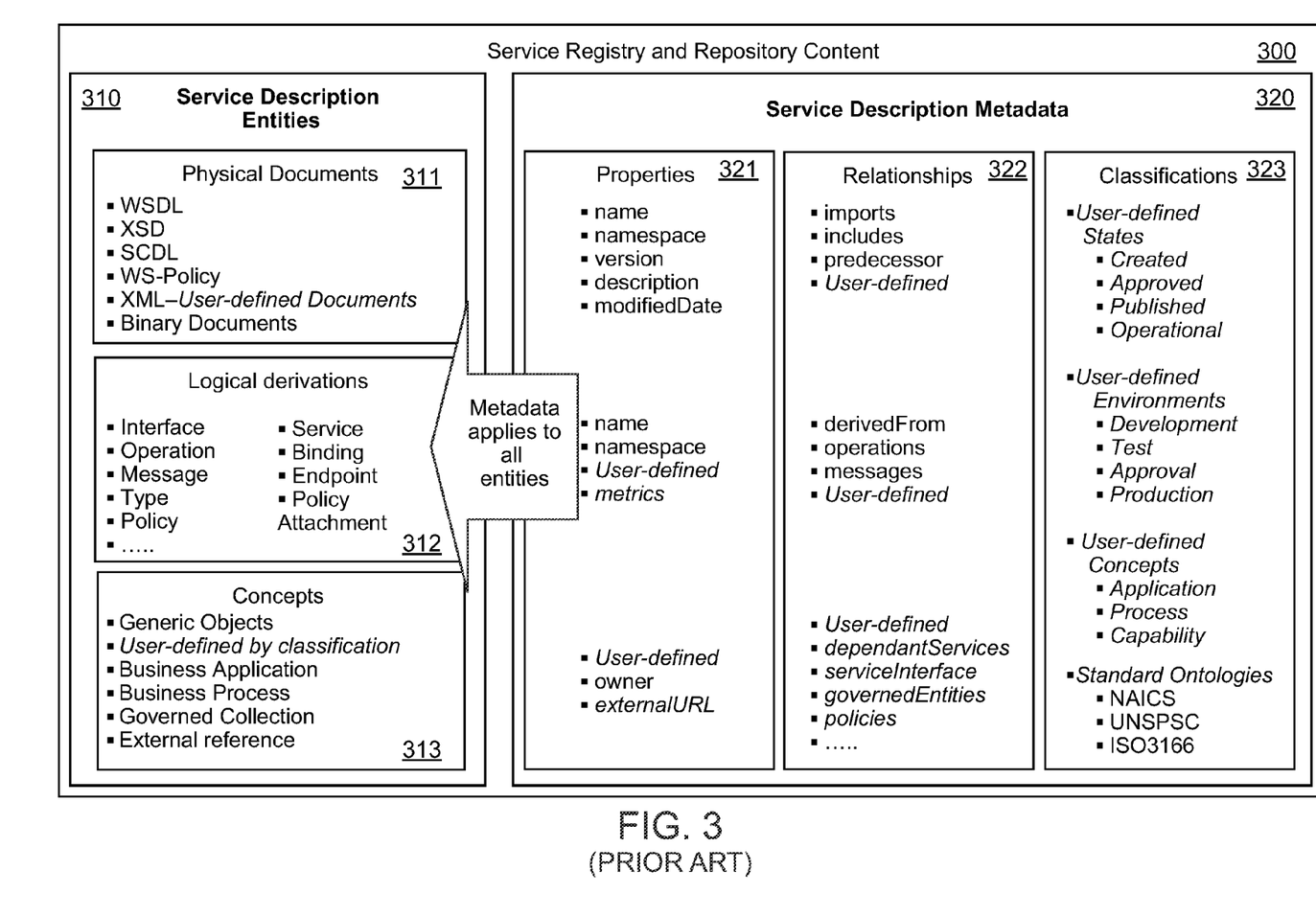
FIG. 3 shows a functional block diagram of content of a conventional Service Registry and Repository.

Referring now also to FIG. 3, an example model for Registry and Repository content 300 is provided. The content model has entities representing service description artifacts and service description metadata. There are three kinds of Service Description Entities 310 that are stored and managed in Registry and Repository. Physical Documents 311 are XML documents that are known as service metadata artifacts. Logical derivations 312 are the finer-grained pieces of content that result when some types of physical document are shredded as they are loaded into Registry and Repository. Concepts 313 are generic entities that are usually typed, and represent anything that is not represented by a document in Registry and Repository.

Service Description Metadata 320 includes metadata types used to annotate the service description entities to explain their semantics. These include Properties 321, Relationships 322 and Classifications 323. Properties are simple name/value pairs that are associated with any of the Service Description Entities. Relationships tie together one source service description entity to one or more target service description entities. Classification systems may be loaded into Registry and Repository where they can then be used to apply semantic meanings to Service Description Entities.

Profile Typing

A process for profile typing in batch loading documents into a service registry module (SR module), such as the Service Registry and Repository 100, is described below, according to an embodiment of the invention.

Users typically have their SR document files (e.g., Physical Documents 311) stored in a directory structure or a single location. The invention not only allows loading the SR document files in a single operation but also automatically detects their type. In one example, the following SR document file types are defined in the SR as Service Registry (SR) Document Types as profiles for profile typing, along with the file extension that will be mapped to them:

| | |
|---|---|
| WSDL Document (definitions) | .wsdl |
| XSD Document (schema) | .xsd |
| Policy Document (Policy) | .policy |
| SCA module (module) | .SCA |
| XML Document (XML) | .xml |
| Other Document | not matching the above extensions. |

Figure 4:
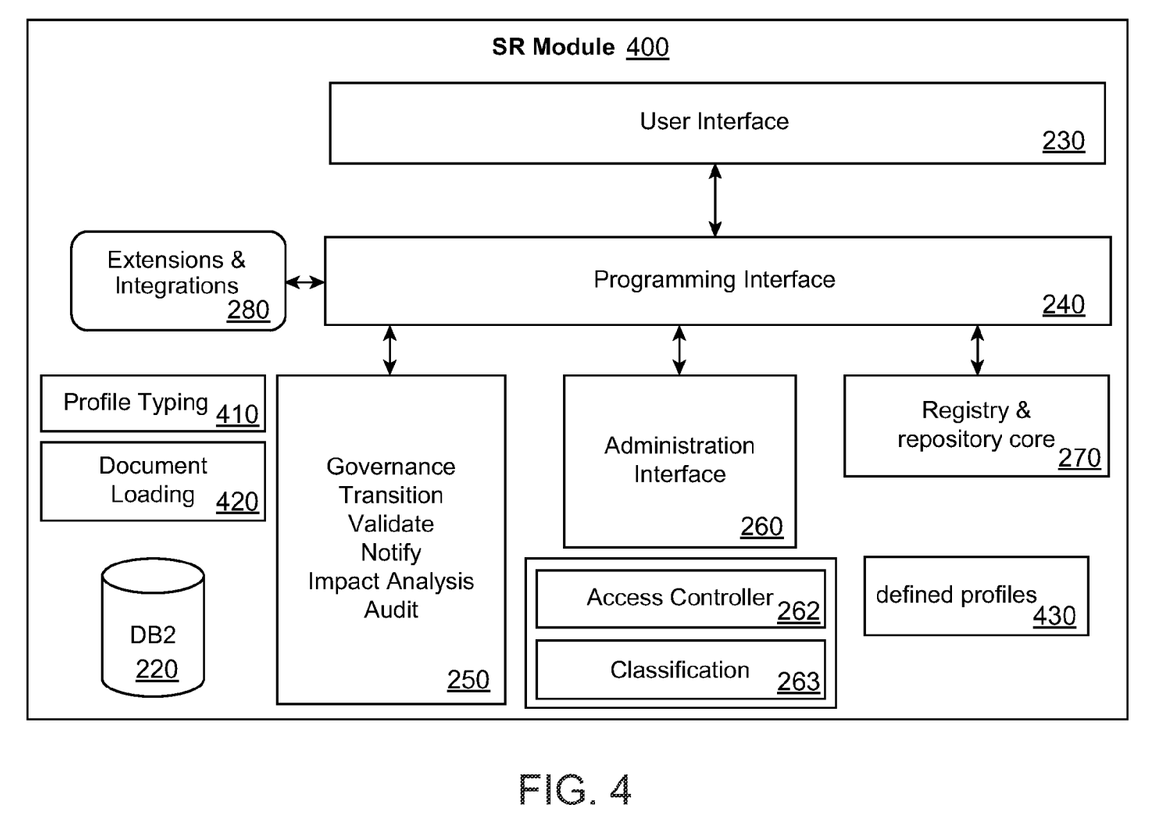
FIG. 4 shows a functional block diagram of a conventional Service Registry and Repository in an SOA, according to an embodiment of the invention.

FIG. 4 shows an embodiment of an SR module 400 including a Profile Typing function 410 that implements a process including three schemes: (1) loading the document files based on a typing profile inside an archive file, or (2) loading the document files and automatically detecting their file type by introspection, or a (3) combination thereof. A document loading module 420 batch loads the files into the service registry module. The three schemes are described below.

A. Loading the Files Based on a Typing Profile Inside an Archive File

This scheme involves providing a definition file that allows the user to define file name pattern matches for each SR Document Type (e.g., among defined Service Registry Document Types 430, FIG. 4, which may be pre-defined by a user). The definition file is present inside the archive file and the SR module is configured to look for this definition file first. These pattern matches will then be used to load each file as the required SR Document Type. If no match is found for the user defined patterns, default patterns will then be used, such as defined by example in the file shown in Table 1 below (a file will always be assigned a file type).

TABLE 1

Default Patterns File

\#
\# If this file is present inside a compressed (Zip) or Jar archive that
\# is loaded into WSRR via the Web UI then the pattern matches in
\# here will be used in preference to the default matches. If a match is
\# not found in this file for a file name in the Zip/Jar file then the default
\# match rules will be used.
\#
\# The most specific match will always be chosen. i.e. if there are rules:
\#
\# xml=*.xml
\# policy=Policy*.xml;LowRiskPolicy.xml
\#
\# and the files Policy2.xml and LowRiskPolicy.xml exist in the Zip/Jar
\# file, then they will be loaded as Policy files and not XML files.
\#
\# Each line of the file should consist of a document type identifier: xml,
\# xsd, wsdl, policy, or other followed by = and then a ; separated list
\# of patterns that WSRR should match for the document type identifier.
\# The only available wildcard is * and this can be used multiple times
\# if necessary.
\#
\# The default match rules are:
\#
\# xml=*.xml
\# xsd=*.xsd
\# wsdl=*.wsdl
\# policy=*.policy
\# other=*
\#
\# NB: All matching is case-insensitive
\#
xml=*.xml
xsd=*.xsd
wsdl=*.wsdl
policy=*.policy
other=*

B. Loading the Files and Automatically Detecting their File Type by Introspection In this scheme, the SR module is configured to identify the files by inspecting each one. Introspection involves determining the types of objects at runtime.

File compression is not required, and allowing detection of Service Component Architecture (SCA) modules (SCA provides a set of specifications which describe a model for building applications and systems using an SOA). A single file can be loaded via this mechanism with the file type set to "Automatic" by the user and the SR module then introspects the file to determine its type. This can also be used in the context of bulk loading from a compressed file. An example process for introspection is provided below:

1) Attempt to parse the first element of the file with an XML parser.
2) If parsing fails, then check the first 4 bytes of the file, if they are the ZIP signature (i.e., compressed) then load as a "ZIP", otherwise load as "Other/Binary". ZIP files would be recursively processed to determine the type of files within them.
3) If parsing is successful, check the element parsed and set the file type from that, as shown in Table 2 below.

TABLE 2

| File Type | Namespace of Element | First XML Element |
|---|---|---|
| WSDL | http://schemas.xmlsoap.org/wsdl/ | definitions |
| XSD | http://www.w3.org/2001/XMLSchema | schema |
| Policy | http://schemas.xmlsoap.org/ws/2004/09/policy | Policy |
| SCA Module | http://www.ibm.com/xmlns/prod/websphere/scdl/6.0.0 | module |

4) If the first element parsed does not match any of the namespace/element name pairs above then set the file type to "XML".

The above steps are described further in relation to FIG. 5, detailed further below.

In one example of automatically inspecting an SR document type (i.e., detecting if a document file is one of the supported XML formats) is by checking for the following regular expression at the beginning of the file:

<\?xml version=".*" encoding=".*"\?>

If the expression is not matched, then load the file as "Other". If the expression is matched (i.e., the file is XML file), then the process parses any defined namespaces as a list of the short hand tags. An example of the namespace definitions includes:

```
<wsdl:definitions targetNamespace=http://ibm.com/sr
 xmlns:impl="http://ibm.com/sr" xmlns:intf="http://ibm.com/sr"
 xmlns:wsdl="http://schemas.xmlsoap.org/wsdl/"
 xmlns:wsdlsoap="http://schemas.xmlsoap.org/wsdl/soap/"
 xmlns:wsi="http://wsi.org/profiles/basic/1.1/xsd"
 xmlns:xsd="http://www.w3.org/2001/XMLSchema">
or
<xsd:schema xmlns:xsd="http://www.w3.org/2001/XMLSchema"
 targetNamespace="http://tonawanda.sr.ibm.com/base">
```

For example, the namespaces are parsed to match xsd:schema to http://www.w3.org/2001/XMLSchema:schema, or to match wsdl:service to http://schemas.xmlsoap.org/wsdl/:service. Once the mappings are determined, the process checks for main identifying tags in the following order, and if found, then the file is of the type specified:

```
"WSDL": http://schemas.xmlsoap.org/wsdl/:service or
 http://schemas.xmlsoap.org/wsdl:service
"XSD": http://www.w3.org/2001/XMLSchema/:schema or
 http://www.w3.org/2001/XMLSchema:schema
"Policy": http://schemas.xmlsoap.org/ws/2004/09/policy:policy or
 http://schemas.xmlsoap.org/ws/2004/09/policy/:policy
```

If none of these match then, the file must be an "XML" file.

C. Loading the Files Based on a Typing Profile Inside an Archive File and Automatically Detecting their File Type by Introspection This scheme involves a combination of the above two schemes to improve performance and accuracy. A user-defined pattern is used to match an initial file type and then the above inspection process is used to check that the file type is correct. The user-defined pattern matches are utilized to decide upon an initial file type and then use the inspection method to check that the file type is correct. This scheme can operate in different ways. Four illustrative implementations are provided below:

a) Ensure each file is matched to its most specific document type

In this case, if the file initially matched as:
   WSDL Document—check it is a WSDL document.
   XSD Document—check it is an XSD document.
   Policy Document—check it is a Policy document.
   XML Document—check it is an XML document and does NOT match WDSL, XSD, or Policy.
   Other—no check needed.

b) Ensure XML format files are either specific or XML
In this case, if the file initially matched as:
   WSDL Document—check it is a WSDL document.
   XSD Document—check it is an XSD document.
   Policy Document—check it is a Policy document.
   XML Document—check it is an XML document, it may match WDSL, XSD, or Policy, but it does not matter if it does.
   Other—no check needed.

c) Ensure that no supported XML types are loaded as Other
This could be used in combination with either of the previous two methods (sections a and b above), but also includes:
In this case, if the file initially matched as:
   Other—check that it is not a supported XML document (WSDL, XSD, Policy).

d) Ensure that no XML types are loaded as Other
This could be used in combination with either of the previous two methods (sections a and b above), but also includes:
In this case, if the file initially matched as:
   Other—check that it is not an XML document.

If a check fails, then the user may be prompted to decide what type to load the file as or the decision may be made automatically based on the introspection results.

Figure 5:
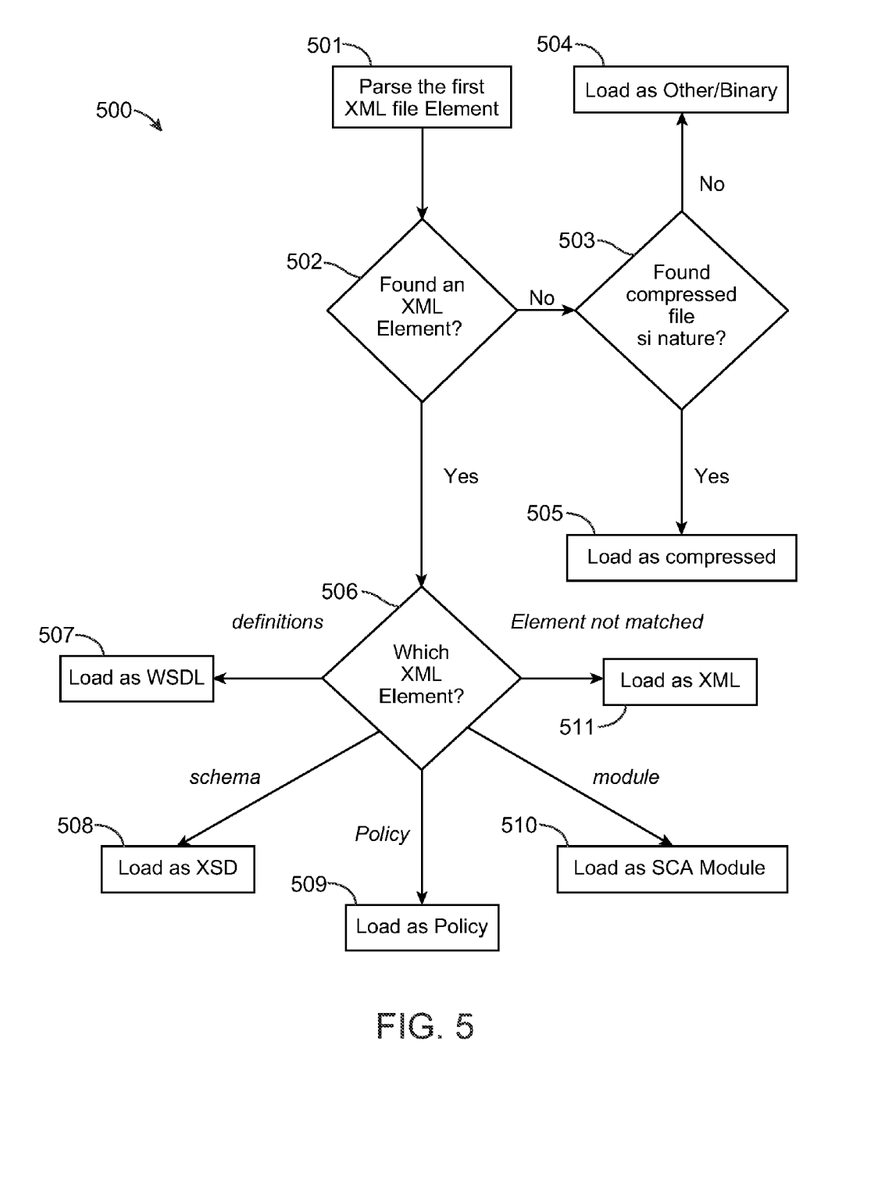
FIG. 5 shows a flowchart of a process for profile typing in batch loading documents into a service registry module in an SOA, according to an embodiment of the invention.

FIG. 5 shows a flowchart of a process 500 for profile typing for batch loading documents into a service registry, involving the scheme in section B above, according to an embodiment of the invention. The process 500 includes:

Block 501: Parse the first XML document file Element.
Block 502: Found an XML file Element? If not, proceed to block 503, else to block 506 to determine document file type.
Block 503: Found the compressed file (ZIP) signature? If not, proceed to block 504, else proceed to block 505.
Block 504: Load as Other/Binary document file type. End.
Block 505: Load as compressed document file type. End.
Block 506: Determine if the XML element matches any of the types: definitions, schema, Policy, module? If matches definitions, proceed to block 507; if matches schema, proceed to block 508; matches policy, proceed to block 509; matches module, proceed to block 510; else proceed to block 511.
Block 507: File element matches definitions, load as WSDL type.
Block 508: File element matches schema, load as XSD type.
Block 509: File element matches Policy, load as Policy type.
Block 510: File element matches module, load as SCA module type.
Block 511: File element not matched, load as XML type.

As is known to those skilled in the art, the aforementioned example architectures described above, according to the invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements.

Figure 6:
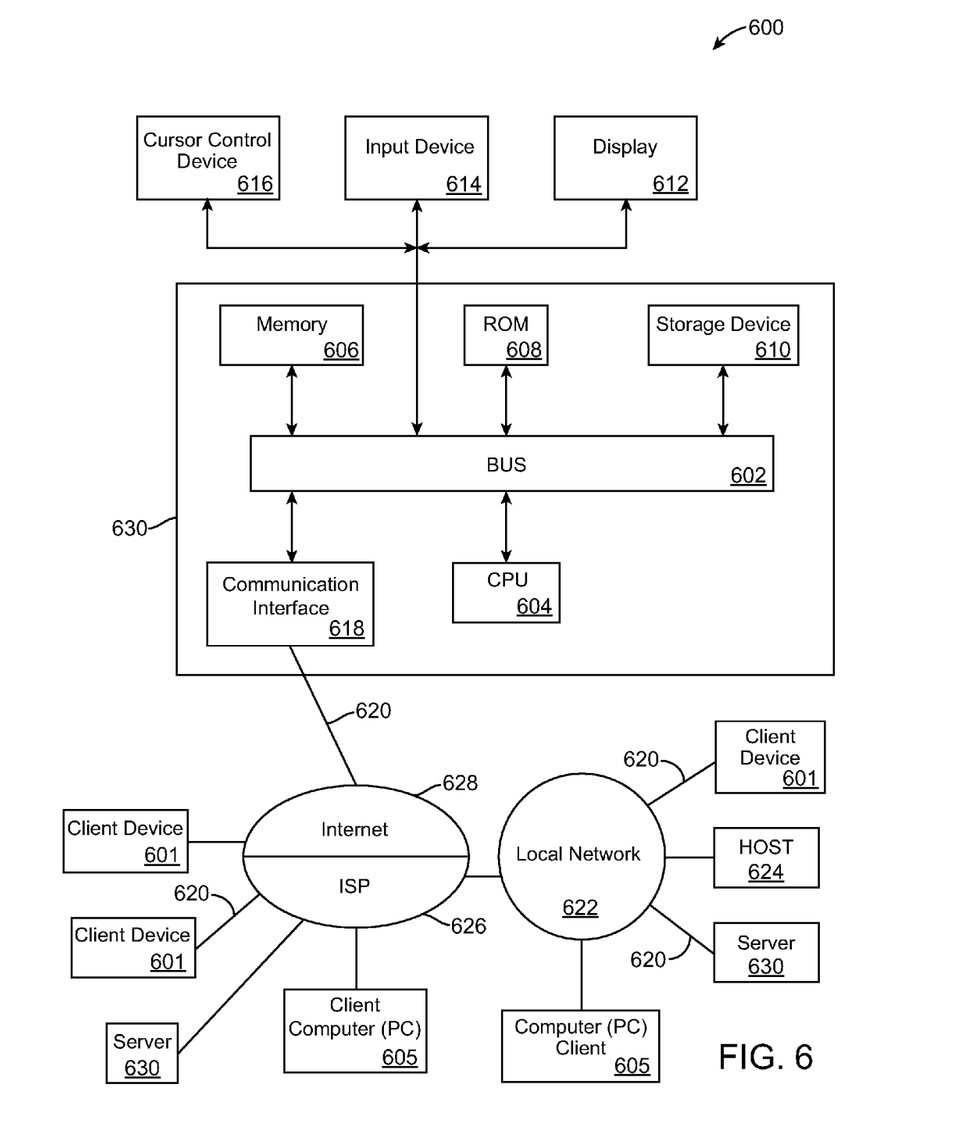
FIG. 6 shows a functional block diagram of an example computing environment for implementing an embodiment of the invention.

FIG. 6 shows a block diagram of an example architecture of an embodiment of a system 600 configured as above, according to an embodiment of the invention. The system 600 includes one or more client devices 601 connected to one or more server computing systems 630. A server 630 includes a bus 602 or other communication mechanism for communicating information, and a processor (CPU) 604 coupled with the bus 602 for processing information. The server 630 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution or instructions to be executed by the processor 604. The server computer system 630 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions. The bus 602 may contain, for example, thirty-two address lines for addressing video memory or main memory 606. The bus 602 can also include, for example, a 32-bit data bus for transferring data between and among the components, such as the CPU 604, the main memory 606, video memory and the storage 610. Alternatively, multiplex data/address lines may be used instead of separate data and address lines.

The server 630 may be coupled via the bus 602 to a display 612 for displaying information to a computer user. An input device 614, including alphanumeric and other keys, is coupled to the bus 602 for communicating information and command selections to the processor 604. Another type or user input device comprises cursor control 616, such as a mouse, a trackball, or cursor direction keys for communicating direction information and command selections to the processor 604 and for controlling cursor movement on the display 612.

According to one embodiment of the invention, the functions of the invention are performed in response to the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein. One or more processors in a multi-processing arrangement may also be employed to execute the sequences of instructions contained in the main memory 606. In alternative embodiments, hard-wired circuitry may be used in place of or in combination with software instructions to implement the invention. Thus, embodiments of the invention are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the invention as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 604 for execution. Such a medium may take many forms, including but not limited to, non-volatile media, volatile media, and transmission media. Non-volatile media includes, for example, optical or magnetic disks, such as the storage device 610. Volatile media includes dynamic memory, such as the main memory 606. Transmission media includes coaxial cables, copper wire and fiber optics, including the wires that comprise the bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to the server 630 can receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 606, from which the processor 604 retrieves and executes the instructions. The instructions received from the main memory 606 may optionally be stored on the storage device 610 either before or after execution by the processor 604.

The server 630 also includes a communication interface 618 coupled to the bus 602. The communication interface 618 provides a two-way data communication coupling to a network link 620 that is connected to the world wide packet data communication network now commonly referred to as the Internet 628. The Internet 628 uses electrical, electromagnetic or optical signals that carry digital data streams. The signals through the various networks and the signals on the network link 620 and through the communication interface 618, which carry the digital data to and from the server 630, are exemplary forms or carrier waves transporting the information.

In another embodiment of the server 630, interface 618 is connected to a network 622 via a communication link 620. For example, the communication interface 618 may be an integrated services digital network (ISDN) card or a modem to provide a data communication connection to a corresponding type of telephone line, which can comprise part of the network link 620. As another example, the communication interface 618 may be a local area network (LAN) card to provide a data communication connection to a compatible LAN. Wireless links may also be implemented. In any such implementation, the communication interface 618 sends and receives electrical electromagnetic or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP) 626. The ISP 626 in turn provides data communication services through the Internet 628. The local network 622 and the Internet 628 both use electrical, electromagnetic or optical signals that carry digital data streams. The signals through the various networks and the signals on the network link 620 and through the communication interface 618, which carry the digital data to and from the server 630, are exemplary forms or carrier waves transporting the information.

The server 630 can send/receive messages and data, including e-mail, program code, through the network, the network link 620 and the communication interface 618. Further, the communication interface 618 can comprise a USB/Tuner and the network link 620 may be an antenna or cable for connecting the server 630 to a cable provider, satellite provider or other terrestrial transmission system for receiving messages, data and program code from another source.

The example versions of the invention described herein are implemented as logical operations in a distributed processing system such as the system 600 including the servers 630. The logical operations of the invention can be implemented as a sequence of steps executing in the server 630, and as interconnected machine modules within the system 600. The implementation is a matter of choice and can depend on performance of the system 600 implementing the invention. As such, the logical operations constituting said example versions of the invention are referred to for e.g. as operations, steps or modules.

Similar to a server 630 described above, a client device 601 can include a processor, memory, storage device, display, input device and communication interface (e.g., e-mail interface) for connecting the client device to the Internet 628, the ISP 626, or LAN 622, for communication with the servers 630.

The system 600 can further include computers (e.g., personal computers, computing nodes) 605 operating the same manner as client devices 601, wherein a user can utilize one or more computers 605 to manage data in the server 630.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of loading document files into a service registry, comprising:
   employing a processor for profile typing document files for loading into a service registry of a computing environment;
   automatically identifying a profile of each document file by:
      identifying the profile of each document file from a set of service registry document types by performing introspection for a document file, wherein introspection includes parsing the document file;
      providing a definition file including predefined file name patterns, wherein each predefined file name pattern corresponds to a service registry document type;
      matching a file name of the document file to a predefined file name pattern; and
      setting the profile of the document file to a service registry document type corresponding to the predefined file name pattern; and
   loading the document files into the service registry based on their corresponding profile.

2. The method of claim 1, wherein automatically identifying a profile of each document file includes non-interactively identifying a profile of each document file.

3. The method of claim 1, further including allowing user-specified service registry document types.

4. The method of claim 1, wherein the computing environment is a service oriented architecture (SOA) computing environment.

5. The method of claim 1, further comprising:
   introspecting the document file to confirm the accuracy of the profile.

6. The method of claim 5, wherein automatically identifying the profile of each document file by introspection further includes:
   parsing a first XML element of the document file with an extensible markup language (XML) parser;
      determining a corresponding service register type for the parsed first XML element; and
      setting the profile of the document file to the corresponding service registry document type.

7. The method of claim 1, wherein the document files are batch loaded into the service registry based on their corresponding profile.

8. A computer program product for loading document files into a service registry, comprising a non-transitory computer usable medium including a computer readable program including instructions, wherein the computer readable program when executed on a computer causes the computer to:
   perform profile typing of document files for loading into a service registry of a computing environment;
   automatically identify a profile of each document file by:
      identifying the profile of each document file from a set of service registry document types by performing introspection for a document file, wherein introspection includes parsing the document file;
      using a definition file including predefined file name patterns, wherein each predefined file name pattern corresponds to a service registry document type;
      matching a file name of the document file to a predefined file name pattern;
      setting the profile of the document file to a service registry document type corresponding to the predefined file name pattern; and
      batch the document files into the service registry based on their corresponding profile.

9. The computer program product of claim 8, further including instructions for automatically identifying a profile of each document file by essentially non-interactively identifying a profile of each document file.

10. The computer program product of claim 8, further including instructions for allowing user-specified service registry document types.

11. The computer program product of claim 8, wherein automatically identify the profile of each document file includes non-interactively identifying a profile of each document file.

12. The computer program product of claim 8, wherein the document files are batch loaded into the service registry based on their corresponding profile.

13. The computer program product of claim 8, wherein introspection further includes:
   parsing a first XML element of the document file with an extensible markup language (XML) parser;
   determining a corresponding service registry document type for the first XML element; and
   setting the profile of the document file to the corresponding service registry document type.

14. The computer program product of claim 8, wherein service registry document types comprise one or more of: definitions, schema, policy, module, and extensible markup language (XML).

15. A computing system, comprising:
   a service registry maintained in a storage device;
   a profiling module that:
      profile types document files for loading into a service registry of the computing system; and
      automatically identifying a profile of each document file by:
         identifying the profile of each document file from a set of service registry document types by performing introspection for a document file, wherein introspection includes parsing the document file;
         using a definition file including predefined file name patterns, wherein each predefined file name pattern corresponds to a service registry document type;
         matching a file name of the document file to a predefined file name pattern; and
         setting the profile of the document file to a service registry document type corresponding to the predefined file name pattern; and
   a loading module configured for loading the document files into the service registry based on their corresponding profile.

16. The system of claim 15, wherein automatically identifying the profile of each document file comprises introspection, wherein introspection includes parsing the document file.

17. The system of claim 15, wherein service registry document types comprise one or more of: definitions, schema, policy, module, and extensible markup language (XML).

18. The system of claim 15, wherein introspection further includes:
   parsing a first extensible markup language (XML) element of the document file with an XML parser;
   determining a corresponding service registry document type for the parsed first XML element; and
   setting the profile of the document file to the corresponding service registry document type.

19. The system of claim 15, wherein the document files are batch loaded into the service registry based on their corresponding profile.

* * * * *